United States Patent [19]

Lamadrid

[11] 4,283,004
[45] Aug. 11, 1981

[54] VIBRATION ATTENUATION SUPPORT ASSEMBLY FOR A CENTRIFUGAL LIQUID PROCESSING APPARATUS

[75] Inventor: Rene G. Lamadrid, Bethesda, Md.

[73] Assignee: Baxter Travenol Laboratories, Inc., Deerfield, Ill.

[21] Appl. No.: 66,576

[22] Filed: Aug. 15, 1979

[51] Int. Cl.³ .................. B01D 21/26; B01D 43/00
[52] U.S. Cl. .................. 233/1 C; 233/25; 233/26; 248/615
[58] Field of Search .................. 233/1 C, 1 R, 23 R, 233/23 A, 24, 25, 26, 27; 248/615, 638

[56] References Cited

U.S. PATENT DOCUMENTS

| | | | |
|---|---|---|---|
| 3,391,469 | 7/1968 | Reeder | 248/615 X |
| 3,401,876 | 9/1968 | Lucas | 233/26 |
| 3,477,674 | 11/1969 | Schaller | 248/615 |
| 3,749,340 | 7/1973 | Williams et al. | 248/615 |
| 3,804,324 | 4/1974 | Sinn et al. | 233/1 C X |
| 4,022,375 | 5/1977 | Suovaniemi et al. | 233/1 R |
| 4,079,882 | 3/1978 | Mizuyoshi et al. | 233/1 C X |
| 4,111,356 | 9/1978 | Boggs et al. | 233/26 |
| 4,113,173 | 9/1978 | Lolachi | 233/25 |
| 4,132,349 | 1/1979 | Khoja et al. | 233/25 |
| 4,194,684 | 3/1980 | Boggs | 233/26 |

FOREIGN PATENT DOCUMENTS

| | | | |
|---|---|---|---|
| 695430 | 10/1964 | Canada | 248/615 |
| 809736 | 8/1951 | Fed. Rep. of Germany | 248/615 |
| 313049 | 7/1930 | United Kingdom | 248/615 |

Primary Examiner—Stanley N. Gilreath
Attorney, Agent, or Firm—Robert A. Benziger; Thomas R. Vigil; Paul C. Flattery

[57] ABSTRACT

The vibration attenuation support assembly is utilized in a centrifugal liquid processing apparatus for supporting a rotor assembly, a non-rotatable arm fixed to and forming part of the support assembly and a prime mover and for attenuating vibrations created by an unbalanced mass in the rotating parts of the apparatus. The apparatus comprises a cabinet having sidewalls and a floor and a rotor assembly mounted on the support assembly mounted on the floor. Tubings are coupled directly between a source of the liquid outside of the rotor to receptacles within the rotor without the use of fluid seals and are supported from the stationary arm. The rotor assembly includes structure for guiding the tubings from the stationary arm to the rotor and a drive train mechanism and prime mover for rotating the tubings at a first speed and for rotating the rotor at a second speed twice the first speed. The support assembly includes a weldment for supporting the rotor assembly and prime mover and includes four elastomeric members for mounting the weldment on the floor. The support assembly has a mass greater than the unbalanced mass and in one embodiment the support assembly together with the rotor assembly and prime mover have a mass of approximately 150 kilograms and the unbalanced mass is 30 grams acting at a radius of 5 inches at a rotation of 1400 revolutions per minute.

19 Claims, 6 Drawing Figures

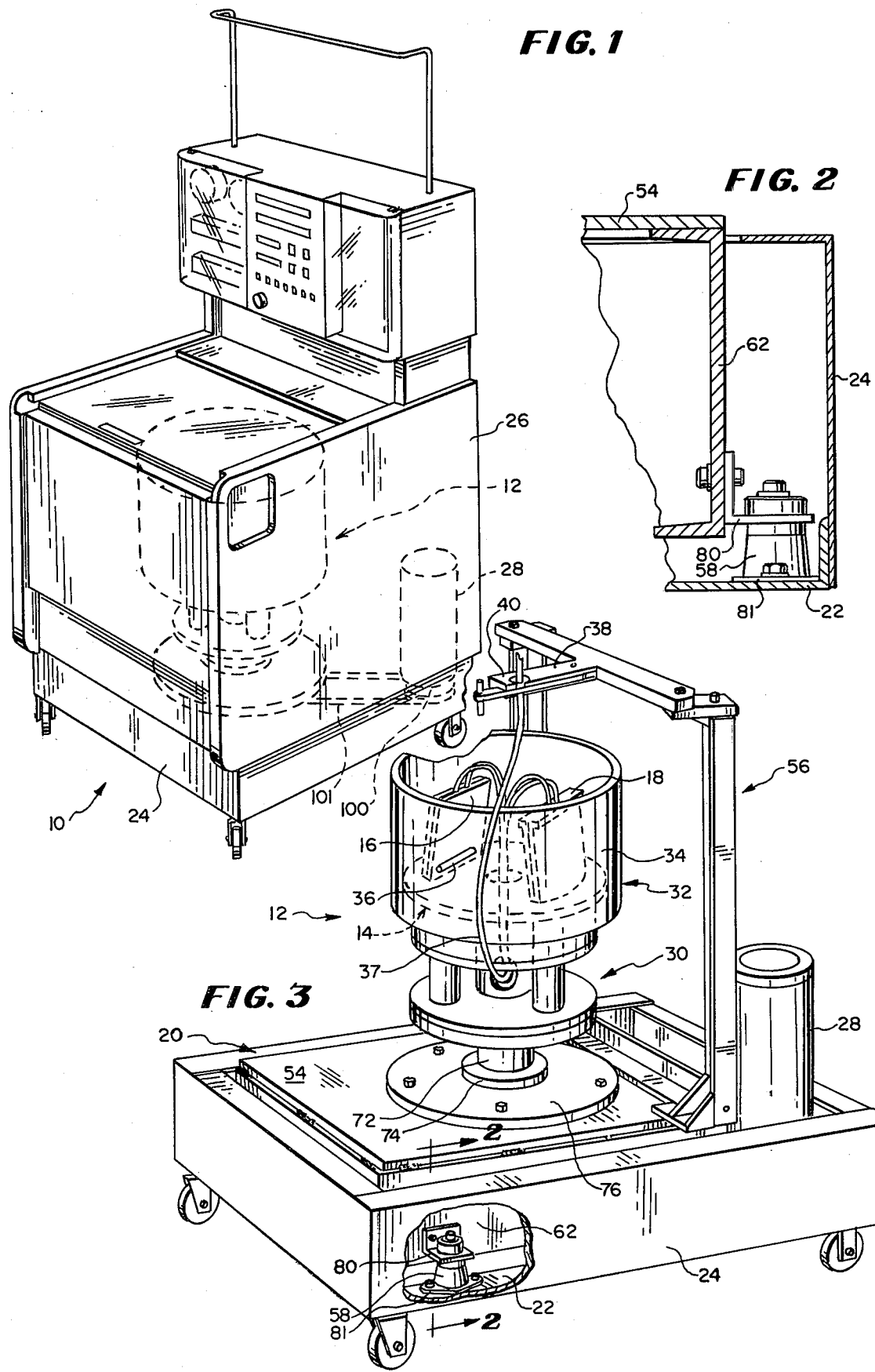

VIBRATION ATTENUATION SUPPORT ASSEMBLY FOR A CENTRIFUGAL LIQUID PROCESSING APPARATUS

BACKGROUND OF THE INVENTION

1. Field of the Invention

The present invention relates to a vibration attenuation support assembly for supporting a rotor assembly and a prime mover therefor in a centrifugal liquid processing apparatus for separating whole blood into the components thereof.

2. Description of the Prior Art

Heretofore various apparatus have been proposed for the separation of whole blood into its component parts. In one such apparatus a continuous tubing is coupled from a source of blood situated outside of the apparatus to a receptacle on a rotor inside the apparatus. A return tubing is coupled from the rotor receptacle to a stationary receptacle situated outside of the rotor. Apparatus of this type are disclosed in U.S. Pat. No. 3,986,442 entitled: DRIVE SYSTEM FOR A CENTRIFUGAL LIQUID PROCESSING SYSTEM, U.S. Pat. No. 4,127,231 entitled: SUPPORT ARM FOR CENTRIFUGAL LIQUID PROCESSING APPARATUS, U.S. Pat. No. 4,132,349 entitled: ROTOR DRIVE ASSEMBLY FOR A CENTRIFUGAL LIQUID PROCESSING APPARATUS, and U.S. Pat. No. 4,146,172 entitled: CENTRIFUGAL LIQUID PROCESSING SYSTEM, the disclosures of which are incorporated herein by reference.

Also, the technique for coupling lines such as tubing or wires directly to a rotor and for preventing the lines from becoming entangled during rotation of the rotor is disclosed in U.S. Pat. No. 3,586,413 entitled: APPARATUS FOR PROVIDING ENERGY COMMUNICATION BETWEEN A MOVING AND A STATIONARY TERMINAL, the disclosure of which is incorporated herein by reference.

Heretofore the rotor assembly and prime mover of the centrifugal liquid processing apparatus have been supported on the floor of the cabinet. When an unbalanced rotating mass is incurred, significant vibrations are developed in the rotation of the rotor which are transmitted to the cabinet and are very irritating to an operator in addition to causing wear of the parts of the apparatus. The unbalanced mass is caused by several factors, including density variations in the liquid contained within the rotor of the apparatus, the unsymmetrical location of receptacles mounted in the rotor, rotating of the tubings about the rotor and the flexing of the tubing as it continuously twists and untwists.

Vibrations produced by an unbalanced rotating mass have long been a problem in the utilization of rotating machinery and various structures have been disclosed for isolating and attenuating vibrations produced in rotating machinery.

Examples of centrifugal liquid processing apparatus and vibration isolation structures for attenuating vibrations produced by an unbalanced rotating mass can be found in the following U.S. Patents.

| U.S. PAT. NO. | PATENTEE |
| --- | --- |
| 1,723,940 | Krantz |
| 2,521,054 | Ellis |
| 2,637,514 | O'Connor |
| 2,987,189 | Evjen |
| 3,249,215 | Kelly |
| 3,363,772 | Jarvis |
| 3,452,924 | Schultz |
| 3,509,742 | Bauer |
| 3,580,014 | Mazza |
| 3,774,710 | McCartney |
| 3,824,701 | Norquist |
| 3,945,226 | de Hedouville |
| 3,986,442 | Khoja et al. |
| 4,113,173 | Lolachi |

In U.S. Pat. No. 2,637,514 there is disclosed a garment treating machine such as a clothes washer or dryer which has a drum mounted for rotation about a horizontal axis. A cabinet of the machine is mounted on springs and fixed at its center by a pivotal mounting. This mounting arrangement allows the apparatus to pitch forward and backward, left and right, and up and down, such movement being restrained by the pivotal central mounting.

In U.S. Pat. No. 3,824,701 there is disclosed a portable centrifugal drier for small articles, having a motor and a frustoconical housing mounted for rotation about a vertical axis on a stabilizing weight disk which is supported on a flat surface by nonskid, resilient, shock absorbing elastomeric feet.

In U.S. Pat. No. 3,580,014 there is disclosed a washing machine furnished with ballast. According to the teachings of this patent, the ballast comprises two containers which can be charged with water to suppress the vibrational motion developed in the washing machine by either a reciprocating motion or a rotary motion. The containers are deformable and can be inflated with air.

As will be described in greater detail hereinafter, the vibration attenuation support assembly of the present invention differs from the previously proposed vibration suppression structures by providing a support assembly for use in a centrifugal liquid processing apparatus where tubings are directly coupled between receptacles inside of and outside of a rotating rotor assembly and where a tubing guide which is part of the rotor assembly and which is coaxial with the rotor is rotated at a first speed and the rotor is rotated at a second speed twice the first speed to prevent the tubing from becoming entangled. The support assembly supports (a) the rotor assembly, (b) a prime mover therefor, and (c) a non-rotatable arm fixed to and forming part of the support assembly for directing the tubing toward the rotor assembly along the axis of rotation of the rotor assembly and attenuates vibration produced as a result of an unbalanced mass in the rotating parts of the apparatus.

SUMMARY OF THE INVENTION

According to the present invention there is provided in a centrifugal liquid processing apparatus of the type which is utilized for separating a liquid containing particles, such as blood, into the components thereof and which includes a cabinet having sidewalls and a floor, a prime mover within the cabinet, a rotor assembly which is situated within the cabinet and which includes a rotor mounting receptacles thereon, tubing coupled directly between a source of the liquid outside the rotor to the receptacles within the rotor without the use of fluid seals, a non-rotatable arm within the cabinet for holding the tubings and for directing the tubings toward the rotor assembly and rotatable tubing guide means for guiding the tubings from the holder to the rotor, the tubing guide means being mounted for coaxial rotation with the rotor, and the rotor assembly including drive train means for coupling the prime mover to the rotor and to the tubing guide means for rotating the tubing guide means at a first speed and for rotating the rotor at a second speed twice the first speed to prevent the tubings from becoming entangled, the improvement comprising a vibration attenuation support means for supporting the rotor assembly, the non-rotatable arm which is fixed to and forms part of said support means, and the prime mover on the floor of the cabinet and for attenuating the vibrations produced as a result of an unbalanced mass in the rotating parts of the apparatus thereby reducing the transmission of such vibrations to the cabinet, said vibration attenuation support means comprising an attenuation and support assembly including a weldment on which the rotor assembly, the prime mover, and said non-rotatable arm are mounted, and elastomeric means for supporting said weldment on the floor of the cabinet and the ratio of the unbalanced mass to the mass of said weldment, said arm, the rotor assembly and the prime mover being between 1:1000 and 1:10,000.

BRIEF DESCRIPTION OF THE DRAWINGS

FIG. 1 is a perspective view of a centrifugal liquid processing apparatus and shows in phantom lines the location of a prime mover and rotor assembly of the apparatus.

FIG. 2 is a vertical fragmentary sectional view of a lower corner of the apparatus and shows an elastomeric member at a corner of a weldment of the vibration attenuation support assembly of the present invention which is utilized in the apparatus shown in FIG. 1.

FIG. 3 is a perspective view of the apparatus shown in FIG. 1 with a top cabinet thereof removed to show the rotor assembly, the prime mover and a non-rotatable support arm for tubings utilized in the apparatus all supported on the vibration attenuation support assembly of the present invention.

DESCRIPTION OF THE PREFERRED EMBODIMENT

Figure 4:
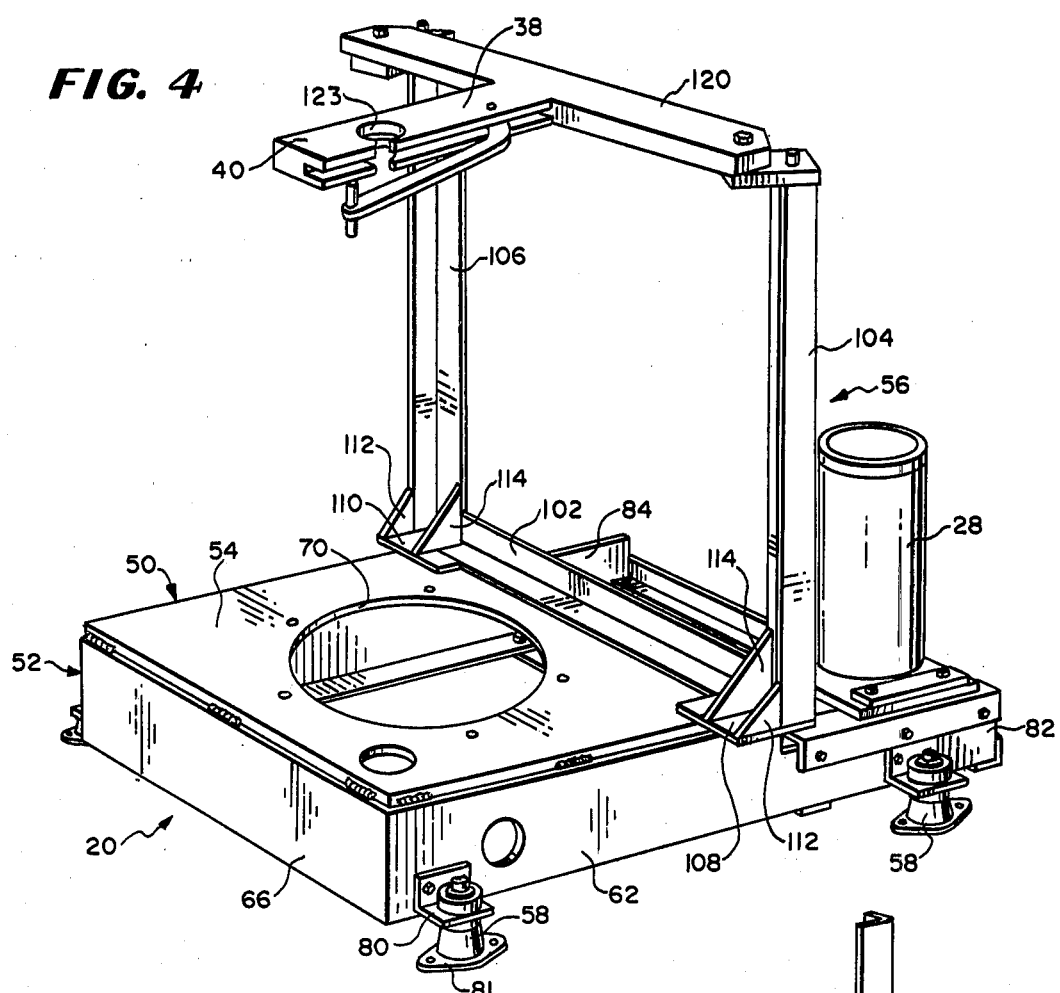
FIG. 4 is a perspective view of the vibration attenuation support assembly viewing the same from one corner thereof with the rotor assembly removed.

Referring now to the drawings in greater detail there is illustrated in FIG. 1 a centrifugal liquid processing apparatus 10 particularly adapted for separating whole blood into the components thereof. The apparatus 10 is of the type known as the CELL SEPARATOR sold by the Instrument Division of Travenol Laboratories, Inc. of Deerfield, Ill. The apparatus 10 comprises a rotor assembly 12 including a rotor 14 (FIG. 3) and two pairs of platens 16 and 18 mounted on the rotor 14 and having liquid receiving receptacles clamped therein.

As will be explained in greater detail hereinafter, the rotor assembly 12 is mounted on a vibration attenuation support assembly 20 which is constructed according to the teachings of the present invention. The support assembly 20 in turn is mounted on a floor 22 of a base 24 on which is mounted a cabinet 26 enclosing the assemblies 12 and 20.

A prime mover 28 is mounted on the support assembly 20 and is drivingly coupled to a rotor drive 30 situated beneath and supporting the rotor 14 and forming part of the rotor assembly 12. The rotor assembly 12 further includes a tubing guide structure 32 comprising a drum 34 which is mounted coaxially with the rotor 14 and a pin 36 which extends from the drum 34 and which is adapted to engage an umbilical tubing 37 having several smaller diameter tubings therein.

A non-rotatable arm 38 is supported on the support assembly 20 with its outer end 40 located on the axis of rotation of the rotor 14. The non-rotatable arm 38 is adapted to guide the umbilical tubing 37 having several smaller diameter tubings therein from a source of liquid (not shown) such as a blood bag, a donor or a patient situated external to the rotor assembly 12 to the receptacles mounted between the platens 16 and 18 on the rotor 14.

The rotor drive 30 is of known type and is constructed and arranged to rotate the tubing guide structure 32 at a first speed and the rotor 14 at a second speed which is twice the first speed.

As disclosed in U.S. Pat. No. 3,586,413 referred to above, by rotating the tubing guide structure 32 so that the pin 26 engages the umbilical tubing 37 and rotates the same at a speed which is one half the speed of rotation of the rotor 14, the umbilical tubing 37 is caused to twist and untwist upon each rotation of the tubing guide structure 32.

In the operation of the apparatus 10, liquid such as whole blood is supplied to one of the receptacles and centrifuged to cause separation of the whole blood into its components, namely red blood cells, white blood cells, platelets and plasma. Then, certain of the components are withdrawn from certain points in the separation receptacle and collected in the receptacle within the rotor assembly 12 and a receptacle outside of the rotor assembly 12.

Since the weight and positioning of the two pairs of platens 16 and 18 is not uniform, since the mass of the tubings and liquids therein is usually unbalanced, and since there are different masses of liquid in the receptacles positioned between each pair of platens 16 and 18, an unbalanced rotating mass is developed as the liquid is being processed during rotation of the rotor assembly 12. At speeds of rotation from 1000 to 2000 rpm, this results in vibrations being created during rotation of the rotor assembly 12, which vibrations are not only annoying by causing the cabinet 26 to vibrate, but also wearing on components of the apparatus 10. The twisting and untwisting of the umbilical tubing 37 in an orbital path about the rotor axis causes the umbilical tubing 37 to exert forces on the non-rotatable arm 38 that also contribute to the vibrations.

According to the teachings of the present invention, this annoying vibration developed as a result of an unbalanced rotating mass is minimized by the vibration attenuation support assembly 20 of the present invention.

Figure 5:
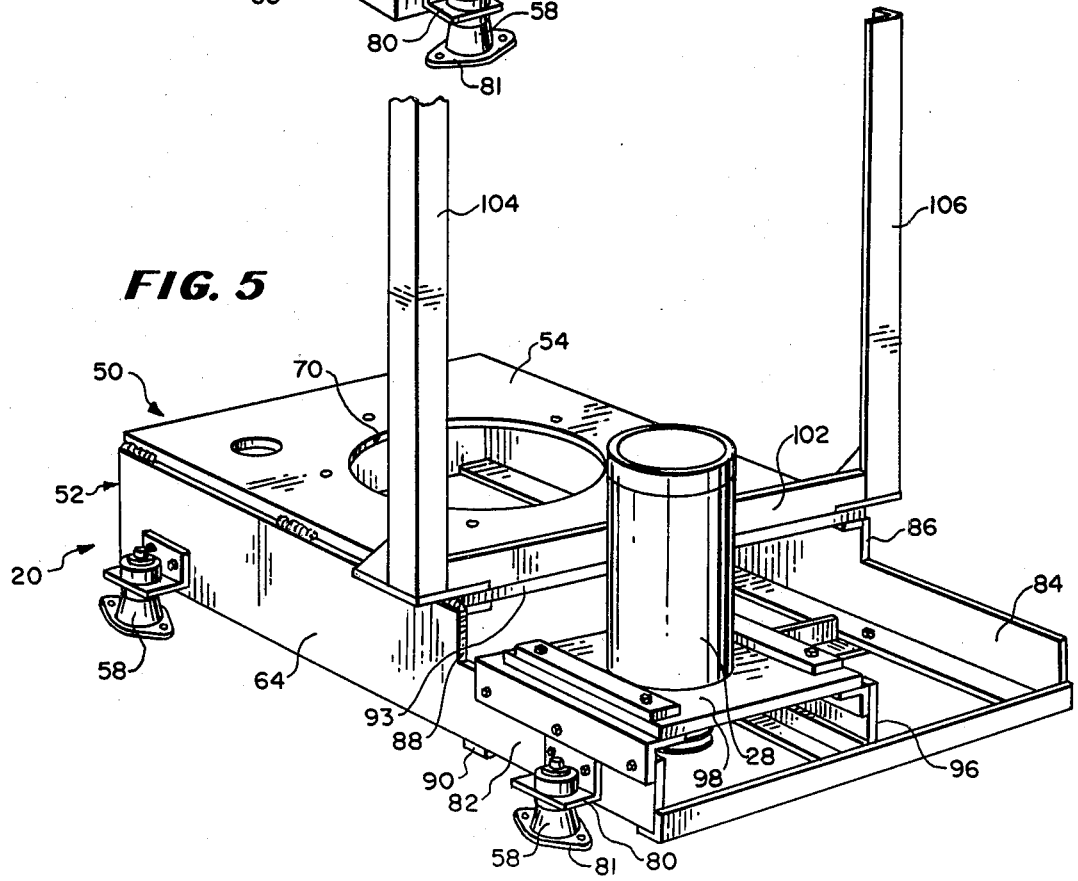
FIG. 5 is a perspective view of the vibration attenuation support assembly viewing the same from another corner thereof with the rotor assembly removed.

The vibration attenuation support assembly 20 comprises a metal (e.g., steel) weldment 50 including a horizontal framework 52 on which is welded a first plate 54, an upright framework 56 welded to the first plate 54 and positioned to support the arm 38 over the rotor assembly 12 and, at least four frusto-conical elastomeric support members 58 of known type fixed to the framework 52 for supporting the weldment 50 on the floor 22 of the base 24 of the cabinet 26 as best shown in FIGS. 4 and 5. Forces on the arm 38 are transmitted by the upright framework 56 to the weldment 50 and attenuated thereby without being transmitted to the cabinet 26.

Figure 6:
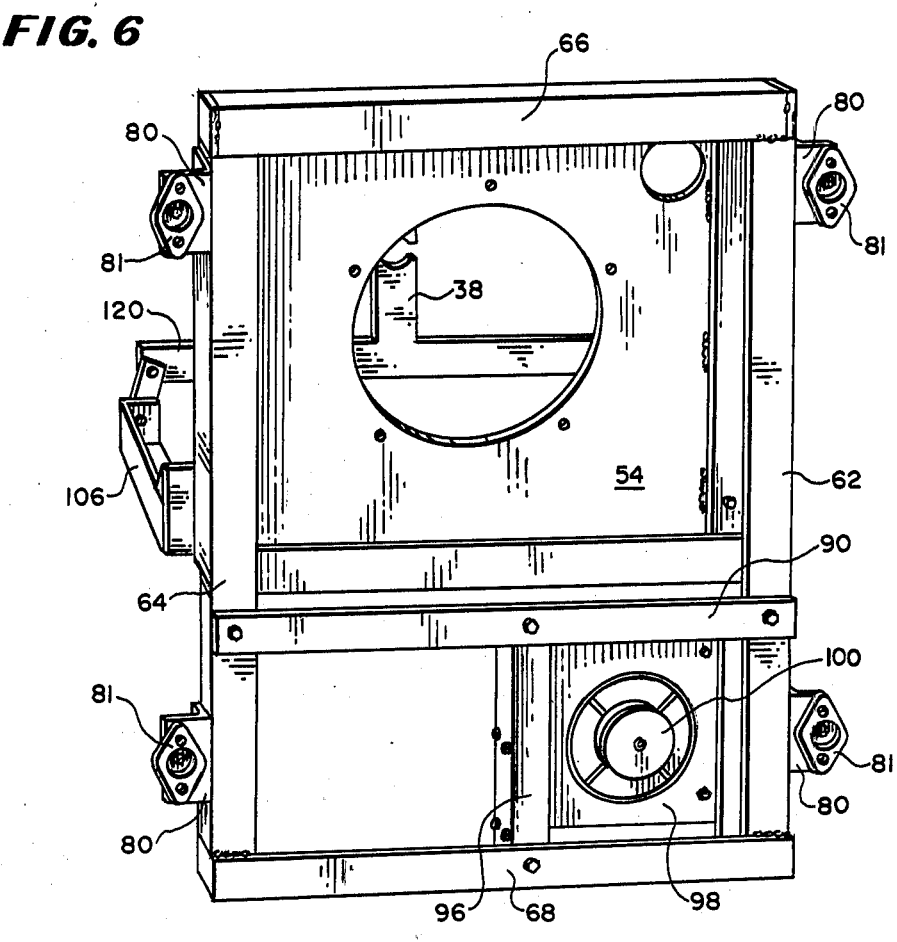
FIG. 6 is a perspective bottom view of the vibration attenuation support assembly.

As shown in FIGS. 4, 5 and 6, the horizontal framework 52 is generally rectangular and includes first and second long frame members 62 and 64 interconnected by first and second short end members 66 and 68, all or which have L or channel cross sections. Fixed to and above the first and second long frame members 62 and 64 and the first short end member 66 is the first plate 54 which has a central circular opening 70 therein for receiving and mounting the rotor assembly 12. More specifically, a shaft 72 (FIG. 3) of the rotor 14 is supported by a bearing 74 on a base plate 76 which is secured to and on the first plate 54 such that the lower end of the shaft 72 with a pulley (not shown) thereon, is positioned beneath the first plate 54 within the framework 52.

As shown, the four frusto-conical elastomeric support members 58 are each secured by means of an L shaped mounting bracket 80 to the side of one of the long frame members 62 or 64. At the bottom of each of the elastomeric members 58 is a mounting flange 81 for securing each elastomeric member 58 to the floor 22 of the base 24 of the cabinet 26.

As best shown in FIG. 5, the two long frame members 62 and 64 have a portion cut away at one end thereof to provide reduced width arm portions 82 and 84. Also it will be noted that the first plate 54 is shorter than the long frame members 62 and 64 so that it only extends to shoulders 86,88 (FIG. 5) at the cut away portion of each long frame member 62,64.

As shown in FIG. 5, the second short end member 68 is a piece of angle iron which as an L shaped cross section and which extends between and is secured to the reduced width arm portions 82,84 of the long frame members 62,64. Another short frame member 90 extends between the long frame members 62,64 at a point beneath one edge 93 of the first plate 54 generally parallel to the second short end member 68. A cross member 96 is fixed to and between the second short end member 68 and the short frame member 90. A second smaller plate 98 is secured on and between the first arm portion 82 and the cross member 96 and has mounted thereon the prime mover 28 which is typically an electric motor. The shaft of the electric motor 28 extends below the second plate 98 and has a pulley 100 (FIG. 6) mounted thereon and a belt 101 (FIG. 1) coupling pulley 100 to the pulley on shaft 72 within the framework 52.

The upright framework 56 includes a horizontally extending L cross section frame member 102 and first and second upright L cross section frame members 104 and 106. Also the upright framework 56 includes first and second support plates 108 and 110 at the lower corners of the upright framework 56 and first and second pairs 112, 114 of trianbular braces which are fixed to and between the upright frame members and the support plates 108, 110 which are welded to the first plate 54.

Mounted to and extending between the upper ends of the upright frame members 104 and 106 is a cross arm 120 (FIG. 4) having each end thereof fixed to the upper end of one of the frame members 104 and 106. The non-rotatable arm 38 is integral with, extends from and forms a T with the cross arm 120 as shown in FIG. 4.

The stationary arm 38 has an aperture 123 therein through which the umbilical tubing 37 is received.

In the use of the apparatus 10, studies and tests were made with an unbalanced rotating mass in the rotating parts of the rotor assembly 12 such as an unbalanced mass of from 1 to 45 grams acting at a radius of from 1 to 8 inches with the rotor 14 rotating at a speed from 1000 rpm to 2000 rmp and it was found that satisfactory attenuation of vibrations developed by the unbalanced mass was obtained with the weldment and arm 38, rotor assembly 12 and prime mover 28 mounted thereon having a mass of between 45 kilograms and 450 kilograms.

More specifically, in a preferred embodiment of the apparatus 10, satisfactory attenuation of vibrations developed by an unbalanced rotating mass of approximately 30 grams acting at a radius of 5 inches from the axis of rotation of the rotor 14 rotating at a rotational speed of approximately 1400 rpm, was obtained by providing a weldment 50 and arm 38, rotor assembly 12 and prime mover 28 mounted thereon in the assembly 20 having a mass of 150 kilograms.

From the parameters of one preferred embodiment and from the empirical studies and tests conducted, it appears that a ratio of the unbalanced mass to the mass of the weldment 50 and arm 38, rotor assembly 12 and the prime mover 28 mounted thereon of between 1 to 1000 and 1 to 10,000 provides satisfactory attenuation of vibrations. A preferred ratio of the unbalanced mass to the mass of the weldment 50 and arm 38, rotor assembly 12 and prime mover 28 mounted thereon is 1 to 5000.

Also, of course, the height of the unbalanced mass within the rotating parts of the rotor assembly above the first plate 54 should be kept as low as possible.

From the foregoing description it will be apparent that the vibration attenuating support assembly 20 in the apparatus 10 of the present invention provides for satisfactory attenuation of the vibrations developed by an unbalanced rotating mass in the rotating parts of the apparatus 10. Also it will be apparent that obvious modifications can be made to the assembly 20 without departing from the teachings of the invention. Accordingly, the scope of the invention is only to be limited as necessitated by the accompanying claims.

I claim:

1. In a centrifugal liquid processing apparatus of the type which is utilized for separating a liquid containing particles, such as blood, into the components thereof and which includes a cabinet having sidewalls and a floor, a prime mover within the cabinet, a rotor assembly which is situated within the cabinet and which includes a rotor mounting receptacles thereon, tubing coupled directly between a source of the liquid outside the rotor to the receptacles within the rotor without the use of fluid seals, a non-rotatable arm within the cabinet for holding the tubings and for directing the tubings toward the rotor assembly and rotatable tubing guide means for guiding the tubings from the holder to the rotor, the tubing guide means being mounted for coaxial rotation with the rotor, and the rotor assembly including drive train means for coupling the prime mover to the rotor and to the tubing guide means for rotating the tubing guide means at a first speed and for rotating the rotor at a second speed twice the first speed to prevent the tubings from becoming entangled, the improvement comprising a vibration attenuation support means for supporting the rotor assembly, the non-rotatable arm which is fixed to and forms part of said support means, and the prime mover on the floor of the cabinet and for attenuating the vibrations produced as a result of an unbalanced mass in the rotating parts of the apparatus thereby reducing the transmission of such vibrations to the cabinet, said vibration attenuation support means comprising an attenuation and support assembly including a weldment on which the rotor assembly, the prime mover, and said non-rotatable arm are mounted, and elastomeric means for supporting said weldment on the floor of the cabinet and the ratio of the unbalanced mass to the mass of said weldment, said arm, the rotor assembly and the prime mover being between 1:1000 and 1:10,000.

2. The apparatus according to claim 1 wherein said elastomeric means comprise a plurality of frusto-conical elastomeric members.

3. The apparatus according to claim 2 wherein said elastomeric means comprise four of said elastomeric members.

4. The apparatus according to claim 1 wherein said weldment comprises a generally rectangular framework and a generally horizontally extending first plate which is secured to said framework and which has an opening therethrough, the rotor assembly being secured to said first plate with a portion of the drive train means extending through said opening.

5. The apparatus according to claim 4 wherein said framework comprises two long frame members, wherein the long dimension of said rectangular framework is longer than the corresponding dimension of said first plate to provide a space in said weldment adjacent one end edge of said first plate and between said two long frame members, the portions of said long frame members extending beyond said first plate forming support arms and wherein said weldment includes a second generally horizontally extending plate which is fixed in said space and which has an opening therethrough, the prime mover being mounted on said second plate with a drive shaft thereof extending through said openings.

6. The apparatus according to claim 4 wherein said weldment includes a plurality of mounting brackets attached to the sides of said rectangular framework for mounting said elastomeric supports, said elastomeric supports being attached between said mounting brackets and the floor of the cabinet.

7. The apparatus according to claim 5 wherein said rotor assembly includes a bearing mounted on said first plate coaxial with said opening therethrough, the drive train means including a shaft rotatably supported by the bearing and extending beneath said first plate and wherein the drive train means includes a pulley on the end of the shaft beneath the first plate, a pulley on the shaft of the prime mover beneath the second plate and a belt drivingly coupling the pulleys beneath said first and second plates and within said framework.

8. The apparatus according to claim 7 wherein said weldment includes two upright members each fixed to a corner of said plate adjacent said space and a cross member fixed to and between said upright members, said non-rotatable arm being fixed to and extending outwardly from said cross member, with said arm intersecting the rotational axis of the rotor.

9. The apparatus according to claim 5 wherein said rectangular framework further comprises first and second short end members, said short end members each being attached generally perpendicular to and between said long members at one end of said framework, said first plate resting on and being secured to said first short member and a portion of said two long members, a first cross member fixed between said long members, generally parallel to and spaced inwardly from a second end member and beneath said one end edge of said first plate, a second cross member fixed to and between said second end member and said first cross member and generally parallel to said first and second long members, said second plate resing on and being secured to one of said arm portions and said second cross member.

10. The apparatus according to claim 9 wherein said weldment includes two upright members each fixed to a corner of said plate adjacent said space and a third cross member fixed to and between said upright members, said non-rotatable arm being fixed to and extending outwardly from said cross member, with the arm intersecting the rotational axis of the rotor.

11. The apparatus according to claim 1 wherein the rotor is driven at a rotational speed between 1000 and 2000 revolutions per minute.

12. The apparatus according to claim 11 wherein said rotor is driven at approximately 1400 revolutions per minute.

13. The apparatus according to claim 1 wherein the unbalanced mass acts at a radius between 1 inch and 8 inches from the axis of rotation of the rotor.

14. The apparatus according to claim 13 wherein the unbalanced mass acts at a radius of approximately 5 inches from the axis of rotation of the rotor.

15. The apparatus according to claim 1 wherein the ratio of the unbalanced mass to the total mass of said weldment, the rotor assembly, said arm and the prime mover is approximately 1 to 5000.

16. The apparatus according to claim 1 wherein the unbalanced mass is not greater than 45 grams and the total mass of said weldment, the rotor assembly, said arm and the prime mover is between 45 kilograms and 450 kilograms.

17. The apparatus according to claim 16 wherein the unbalanced mass is approximately 30 grams and the total mass of said weldment, the rotor assembly, said arm and the prime mover is approximately 150 kilograms.

18. The apparatus according to claim 1 wherein the rotor is driven at a rotational speed between 1000 and 2000 revolutions per minute, said unbalanced mass acts at a radius between 1 and 8 inches from the axis of rotation of the rotor and is not greater than 45 grams, and the mass of said weldment, the rotor assembly, said arm and the prime mover is between 45 kilograms and 450 kilograms.

19. The apparatus according to claim 1 wherein the rotor is driven at a speed of approximately 1400 revolutions per minute, the unbalanced mass acts at a radius of approximately 5 inches from the axis of rotation of the rotor and is approximately 30 grams and the mass of said weldment, the rotor assembly, said arm and the prime mover is approximately 150 kilograms.

* * * * *